(12) United States Patent
Ogawa et al.

(10) Patent No.: US 6,278,500 B1
(45) Date of Patent: Aug. 21, 2001

(54) LIQUID CRYSTAL DEVICE AND PROJECTOR DISPLAY DEVICE HAVING A SPECIFIC RELATIONSHIP FOR THE F-NUMBERS OF THE ILLUMINATION OPTICAL SYSTEM

(75) Inventors: Yasunori Ogawa, Suwa; Akitaka Yajima, Tatsuno-machi; Takeshi Takizawa, Shiojiri, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/413,194

(22) Filed: Oct. 5, 1999

(30) Foreign Application Priority Data

Oct. 6, 1998 (JP) .................................................. 10-300359

(51) Int. Cl.$^7$ ................................................. G02F 1/1335
(52) U.S. Cl. ..................................... 349/5; 349/8; 349/95
(58) Field of Search ................................ 349/5, 95, 8

(56) References Cited

U.S. PATENT DOCUMENTS

| | | | |
|---|---|---|---|
| 5,581,379 | * 12/1996 | Aoyama et al. | 349/5 |
| 5,701,165 | * 12/1997 | Kubo et al. | 349/5 |
| 5,731,899 | * 3/1998 | Meyers | 359/621 |
| 5,743,611 | * 4/1998 | Yamagushi et al. | 353/31 |
| 5,757,443 | * 5/1998 | Kobayashi | 349/5 |
| 5,767,924 | * 6/1998 | Hiroki et al. | 349/5 |

FOREIGN PATENT DOCUMENTS 5-346566 * 12/1993 (JP).
9-43587 * 12/1993 (JP).

* cited by examiner

Primary Examiner—James A. Dudek
Assistant Examiner—Mike Qi
(74) Attorney, Agent, or Firm—Oliff & Berridge, PLC

(57) ABSTRACT

The invention prevents deterioration of the image quality caused by dust adhering to the surface of a liquid crystal device. The invention is a liquid crystal device that includes an emergent-side substrate section, an incident-side substrate section disposed opposing the emergent-side substrate section, and a liquid crystal layer sandwiched between the emergent-side substrate section and the incident-side substrate section. The incident-side substrate section includes an incident-side substrate, an electrode that drives the liquid crystal layer formed on the incident-side substrate, and a micro-lens array disposed toward an incident side of the liquid crystal device relative to the incident-side substrate and having a plurality of micro-lenses that condense light beams onto a plurality of pixels. A thickness Ti of the incident side-substrate section along a direction of travel of a light beam is larger than a thickness To of the emergent side-substrate section along the direction of travel of the light beam.

13 Claims, 7 Drawing Sheets

F - NUMBER $F_L$ OF ILLUMINATING OPTICAL SYSTEM ≥ F - NUMBER $F_P$ OF PROJECTION OPTICAL SYSTEM

LIQUID CRYSTAL DEVICE AND PROJECTOR DISPLAY DEVICE HAVING A SPECIFIC RELATIONSHIP FOR THE F-NUMBERS OF THE ILLUMINATION OPTICAL SYSTEM

BACKGROUND OF THE INVENTION

1. Field of Invention

This invention relates to a liquid crystal device and to a projection display device using the liquid crystal device.

2. Description of Related Art

A projection display device can be used to display a computer image and a television image. The projection display device modulates a light beam emitted from a light source with an electro-optical device called a light valve, and projects the modulated light beam onto a screen to display an image. A liquid crystal device is usually used as the light valve of such a projection display device.

The projection display device is usually provided with a cooling fan, and the liquid crystal device is cooled by a flow of air generated by the cooling fan. However, since dust is often included in air, the dust may adhere to the surface of the liquid crystal device. When the dust adheres to the surface of the liquid crystal device, a shadow of the adhered dust is projected, such that the quality of an image displayed by the projection display device is deteriorated.

SUMMARY OF THE INVENTION

This invention is directed to solving the above-described problems in the conventional art, and an object of the invention is to provide a technique preventing the deterioration of image quality, even if the dust adheres to the surface of the liquid crystal device.

In order to solve the above-described problems, a projection display device of the present invention includes:

a liquid crystal device, having a plurality of pixels, that modulates and emits a light beam according to a given image signal;

an illuminating optical system that provides a light beam to the liquid crystal device; and a projection optical system that projects an image light beam emitted from the liquid crystal device to project an image onto a screen;

wherein the liquid crystal device includes an emergent-side substrate section, an incident-side substrate section disposed opposing the emergent-side substrate section; and a liquid crystal layer disposed between the emergent-side substrate section and the incident-side substrate section;

wherein the incident-side substrate section includes an incident-side substrate, an electrode that drives the liquid crystal layer formed on the incident-side substrate, and a micro-lens array disposed toward an incident side of the liquid crystal device relative to the incident-side substrate and having a plurality of micro-lenses that condense light beams into a plurality of pixels; and wherein a thickness Ti of the incident-side substrate section along a direction of travel of a light beam is larger than a thickness To of the emergent-side substrate section along the direction of travel of the light beam.

In accordance with this structure, the light beam condensed by the micro-lens enters the liquid crystal layer, so that the light beam emitted from the liquid crystal layer is diffused by the action of the micro-lens. In this case, the divergence of the light beam emitted from the liquid crystal device is larger than that of a liquid crystal device having no micro-lens, so that the influence of the dust on the emergent plane of the liquid crystal device is reduced. Therefore, as compared with the influence of the dust on the emergent plane of the liquid crystal device, the influence of the dust on the incident plane of the liquid crystal device tends to be relatively great. If the above arrangement is employed, the influence of the dust adhering to the side of the incident plane of the liquid crystal device can be reduced in such a manner as to come close to the influence of the dust adhering to the side of the emergent plane of the liquid crystal device, because the plane on the incident side of the liquid crystal device is located at a position further away from the liquid crystal layer than the plane on the emergent side.

In the above arrangement, the incident-side substrate section may further include an incident side-glass plate provided toward the incident side of the liquid crystal device relative to the micro-lens array;

the emergent-side substrate section may preferably include an emergent-side substrate, an electrode that drives the liquid crystal layer formed on the emergent-side substrate, and an emergent-side glass plate provided toward an emergent side of the liquid crystal device relative to the emergent-side substrate; and a thickness of the incident-side glass plate and the emergent-side glass plate may preferably be set in such a manner that the thickness Ti of the incident-side substrate section is larger than the thickness To of the emergent-side substrate section.

With the above arrangement, the thickness Ti and To of the incident-side substrate section and the emergent-side substrate section can be easily adjusted by adjusting the thickness of the incident-side glass plate and the emergent-side glass plate.

In each of the above cases, if F-numbers of the illuminating optical system and the projection optical system are taken as $F_L$ and $F_P$, respectively, the thickness Ti and the thickness To may preferably satisfy the relationship Ti≈To× $(F_L/F_P)$.

With the above arrangement, the influence of the dust adhering to the incident side of the liquid crystal device can be made substantially equal to the influence of the dust adhering to the emergent side of the liquid crystal device.

Incidentally, of the optical elements that are included in the illuminating optical system, the F-number of an optical element disposed on the lowermost side of an optical path may be used as the F-number $F_L$.

In this case, the illuminating optical system may include:

a light source;

a dividing optical system that divides a light beam emitted from the light source into a plurality of partial light beam fluxes; and a superimposing optical system having the function of substantially superimposing the plurality of partial light beam fluxes on the liquid crystal device, wherein the F-number of the superimposing optical system is used as the F-number $F_L$.

In addition, the illuminating optical system may include:

a light source;

a first lens array having a plurality of first small lenses that divide a light beam emitted from the light source into a plurality of partial light beam fluxes; and a second lens array having a plurality of second small lenses corresponding to the plurality of first small lenses, wherein the F-number of the second lens array may be used as the F-number $F_L$.

Furthermore, the illuminating optical system may include:

a light source;

a first lens array having a plurality of first small lenses that divide a light beam emitted from the light source into a plurality of partial light beam fluxes;

a second lens array having a plurality of second small lenses corresponding to the plurality of first small lenses; and a superimposing lens that substantially superimposes a plurality of partial light beam fluxes emitted from the second lens array on said liquid crystal device; wherein the F-number of the superimposing lens may be used as said F-number $F_L$.

Even if each of the above-described illuminating optical systems is employed, the influence of the dust adhering to the incident side of the liquid crystal device can be made substantially equal to the influence of the dust adhering to the emergent side of the liquid crystal device.

In each of the above cases, the projection display device may include:

a color-light-beam-separating optical system that separates a light beam emitted from the illuminating optical system into a plurality of color light beams;

a plurality of the liquid crystal devices that modulates and emits color light beams separated by the color-light-beam-separating optical system;

a color-light-beam-synthesizing optical system that synthesizes the color light beams emitted from the plurality of liquid crystal devices; and a projection optical system that emits and projects a light beam synthesized by the color-light-beam synthesizing optical system.

A liquid crystal device of the present invention includes:

an emergent-side substrate section; an incident-side substrate section disposed opposing the emergent-side substrate section; and a liquid crystal layer disposed between the emergent-side substrate section and the incident-side substrate section;

wherein the incident-side substrate section includes an incident-side substrate, an electrode that drives the liquid crystal layer formed on the incident-side substrate, and a micro-lens array having a plurality of micro-lenses that condense light beams onto a plurality of pixels; and wherein a thickness Ti of the incident-side substrate section along a direction of travel of a light beam is larger than a thickness To of the emergent-side substrate section along the direction of travel of the light beam.

In addition, the incident-side substrate section may further include an incident side-glass plate provided toward an incident side of the liquid crystal device relative to the micro-lens array;

the emergent-side substrate section may include an emergent-side substrate, an electrode that drives the liquid crystal layer formed on the emergent-side substrate, and an emergent-side glass plate provided toward an emergent side of the liquid crystal device relative to the emergent-side substrate; and the thickness of the incident-side glass plate and the emergent-side glass plate may preferably be set in such a manner that the thickness Ti of the incident-side substrate section is larger than the thickness To of the emergent-side substrate section.

If the liquid crystal devices of the above arrangements are applied to a projection display device, operations and advantageous effects similar to those of the projection display device of the present invention can be obtained.

DETAILED DESCRIPTION OF PREFERRED EMBODIMENTS

A description will now be given of the embodiment of the present invention with reference to the drawings. In the following description, the direction in which a light beam travels is referred to as the z direction, the direction of 3 o'clock as viewed from the direction of travel of a light beam (z direction) is referred to as the x direction, and the direction of 12 o'clock is referred to as the y direction.

Figure 1:
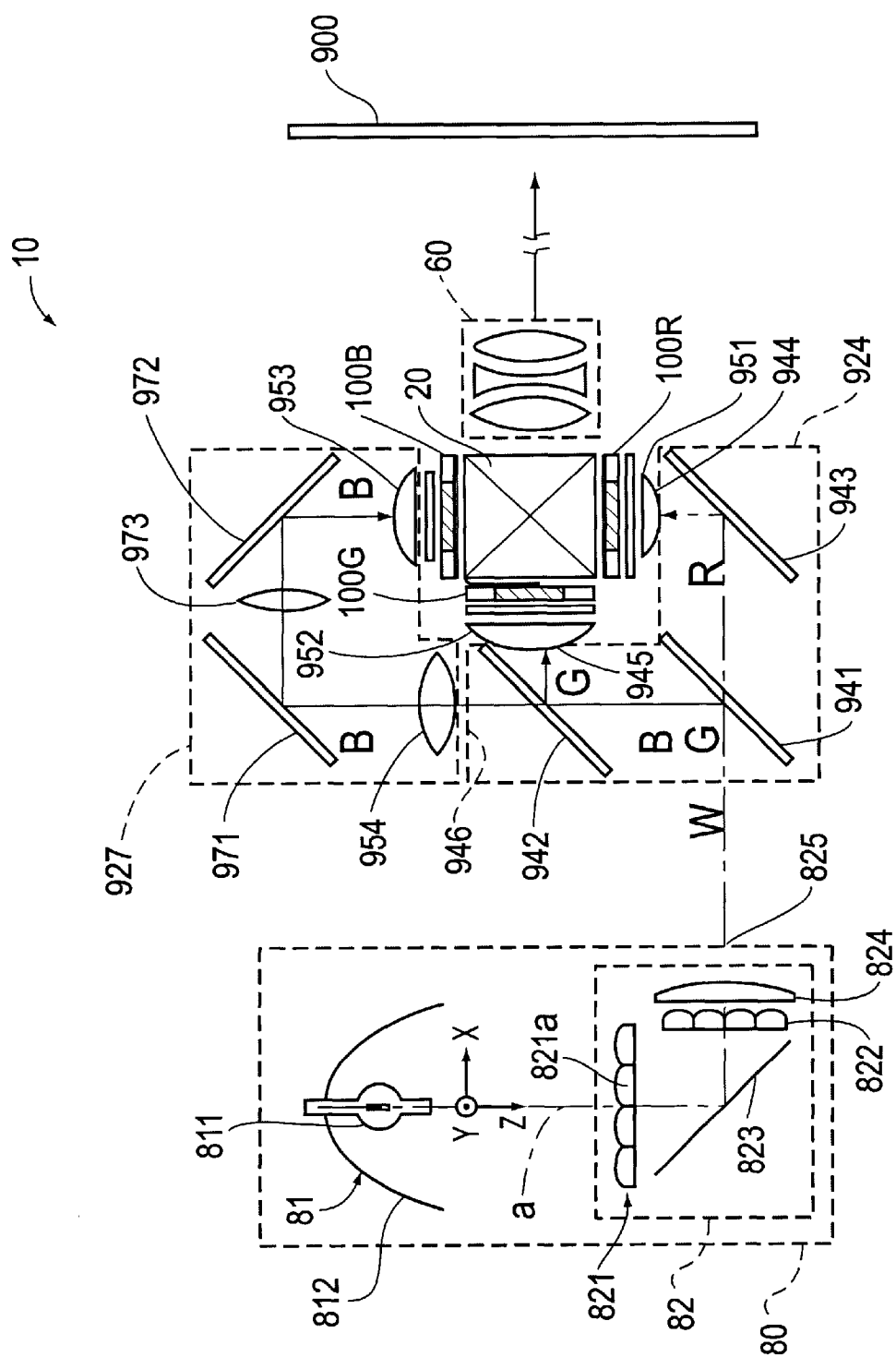
FIG. 1 is a schematic plan view showing a principal part of an optical system of a projection display device 10 as an embodiment of the present invention.

FIG. 1 is a schematic plan view showing a principal part of an optical system of a projection display device 10 as an embodiment of the present invention. The projection display device 10 includes an illuminating optical system 80; a color-light-beam-separating optical system 924; a light guide optical system 927; three sheets of liquid crystal devices 100R, 100G, and 100B; a crossed dichroic prism 20; and a projection optical system 60. The projection display device 10 separates a light beam emitted from the illuminating optical system 80 into light beams of three colors of red, green, and blue by the color-light-beam-separating optical system 924, modulates the separated color light beams through the liquid crystal devices 100R, 100G, and 100B according to image information; and synthesizes the modulated color light beams by the crossed dichroic prism 20 to display an image on a screen 900 via the projection optical system 60.

The illuminating optical system 80 includes a light source 81 that emits substantially parallel luminous fluxes, and an integrator optical system 82. The light source 81 has a light source lamp 811 serving as a radiation light source that emits radial light beams, and a concave mirror 812 that emits radial light beams emitted from the light source lamp 811 as substantially parallel light beam fluxes. A metal halide lamp or a high-pressure mercury lamp is usually used as the light source lamp 811. A parabolic mirror may preferably be used as the concave mirror 812, however, an ellipsoidal mirror or a spherical mirror may be used.

The integrator optical system 82 includes a first lens array 821, a second lens array 822, and a superimposing lens 824. In addition, a reflecting mirror 823 is included so as to bend an optical axis a of a light beam emitted from the first lens array 821 at a substantially right angle. The second lens array 822 and the superimposing lens 824 are disposed substantially perpendicular to the first lens array 821 with the reflecting mirror 823 therebetween. Incidentally, the reflecting mirror 823 may be omitted by disposing the light source 81 and the first lens array 821 so as to be substantially parallel with the second lens array 822.

The integrator optical system 82 has the function of illuminating substantially uniformly the three sheets of the liquid crystal devices 100R, 100G, and 100B, which are illumination areas. The first lens array 821 has the function of dividing a light beam emitted from the light source 81 into a plurality of partial light beam fluxes by small lenses 821a, each having a substantially rectangular outline, that are arranged in the form of matrix. In addition, the second lens array 822 has the function of adjusting the central axes of the partial light beam fluxes to be in parallel with a system optical axis by means of small lenses, each having a substantially rectangular outline, that are arranged to correspond to the first lens array 821. Incidentally, it is possible to omit the second lens array 822 when the light beams emitted from the light source are excellent in parallelism. The superimposing lens 824 has the function of substantially superimposing the plurality of partial light beam fluxes emitted from the first and second lens arrays 821 and 822 on the liquid crystal devices 100R, 100G, and 100B, which are illumination areas.

The color-light-beam-separating optical system 924 includes two sheets of dichroic mirrors 941 and 942, and a reflecting mirror 943, and has the function of separating a light beam flux W emitted from the illuminating optical system 80 into light beams of three colors of red, green, and blue. The first dichroic mirror 941 transmits a red light beam component of the light beam emitted from the illuminating optical system 80, and reflects a blue light beam component and a green light beam component. The red light beam R transmitted by the first dichroic mirror 941 is reflected by the reflecting mirror 943, and is emitted toward the crossed dichroic prism 20 from a red-light-beam-emitting part 944. The red-light-beam-emitting part 944 represents a boundary area of the color-light-beam-separating optical system 924 of the red light beam R emitted from the color-light-beam-separating optical system 924 and other optical systems. A green-light-beam-emitting part 945 and a blue-light-beam-emitting part 946 to be described hereinbelow similarly indicate boundary areas of the color-light-beam-separating optical system 924 of a green light beam G and a blue light beam B and other optical systems. The red light beam R emitted from the red-light-beam-emitting part 944 passes through a field lens 951 to reach the liquid crystal device 100R for the red light beam. The field lens 951 converts partial light beam fluxes emitted from the second lens array 822 into substantially parallel light beam fluxes, respectively. Field lenses 952 and 953 provided in front of other liquid crystal devices are similar to the field lens 951.

Of the blue light beam B and the green light beam G reflected by the first dichroic mirror 941, the green light beam G is reflected by the second dichroic mirror 942, and is emitted toward the crossed dichroic prism 20 from the green-light-beam-emitting part 945. The green light beam G emitted from the green-light-beam-emitting part 945 passes through the field lens 952 to reach the liquid crystal device 100G for the green light beam. On the other hand, the blue light beam B transmitted by the second dichroic mirror 942 is emitted from the blue-light-beam-emitting part 946 to enter the light guide optical system 927. The blue light beam entering the light guide optical system 927 passes through an incident-side lens 954, a relay lens 973, reflecting mirrors 971 and 972, and an emergent-side lens (field lens) 953 included in the light guide optical system 927 to reach the liquid crystal device 100B for the blue light beam. Since the length of the optical path of the blue light beam is longer than that of other color light beams, the light guide optical system is employed for the blue light beam in order to prevent the deterioration of the utilization efficiency of light, that is, in order to propagate the blue light beam entering the incident-side lens 954 so as not to be deteriorated when it enters the emergent-side lens 953. The distances between an emitting part 825 of the light beam flux W emitted from the illuminating optical system 80 and the emitting parts 944, 945, and 946 of the color light beams in the color-light-beam-separating optical system 924 are set to be equal to each other.

The three sheets of the liquid crystal devices 100R, 100G, and 100B serve as optical modulation devices that modulate respective light beams of three colors to form an image according to given image information (image signal). The crossed dichroic prism 20 serves as a color-light-beam-synthesizing optical system to synthesize the light beams of three colors modulated via the liquid crystal devices 100R, 100G, and 100B to form a color image. The crossed dichroic prism 20 has dielectric multilayer films that reflect the red light beam and dielectric multilayer films that reflect the blue light beam formed into substantially an X shape on the interfaces of four rectangular prisms. The light beams of three colors are synthesized by these dielectric multilayer films, whereby a synthesized light beam that projects a color image is formed. A light beam synthesized by the crossed dichroic prism 20 is emitted toward the optical projection system 60. The projection optical system 60 projects the synthesized light beam emitted from the crossed dichroic prism 20 to display a color image on the screen 900. A telemetric lens may be employed as the projection optical system 60.

Figure 2:
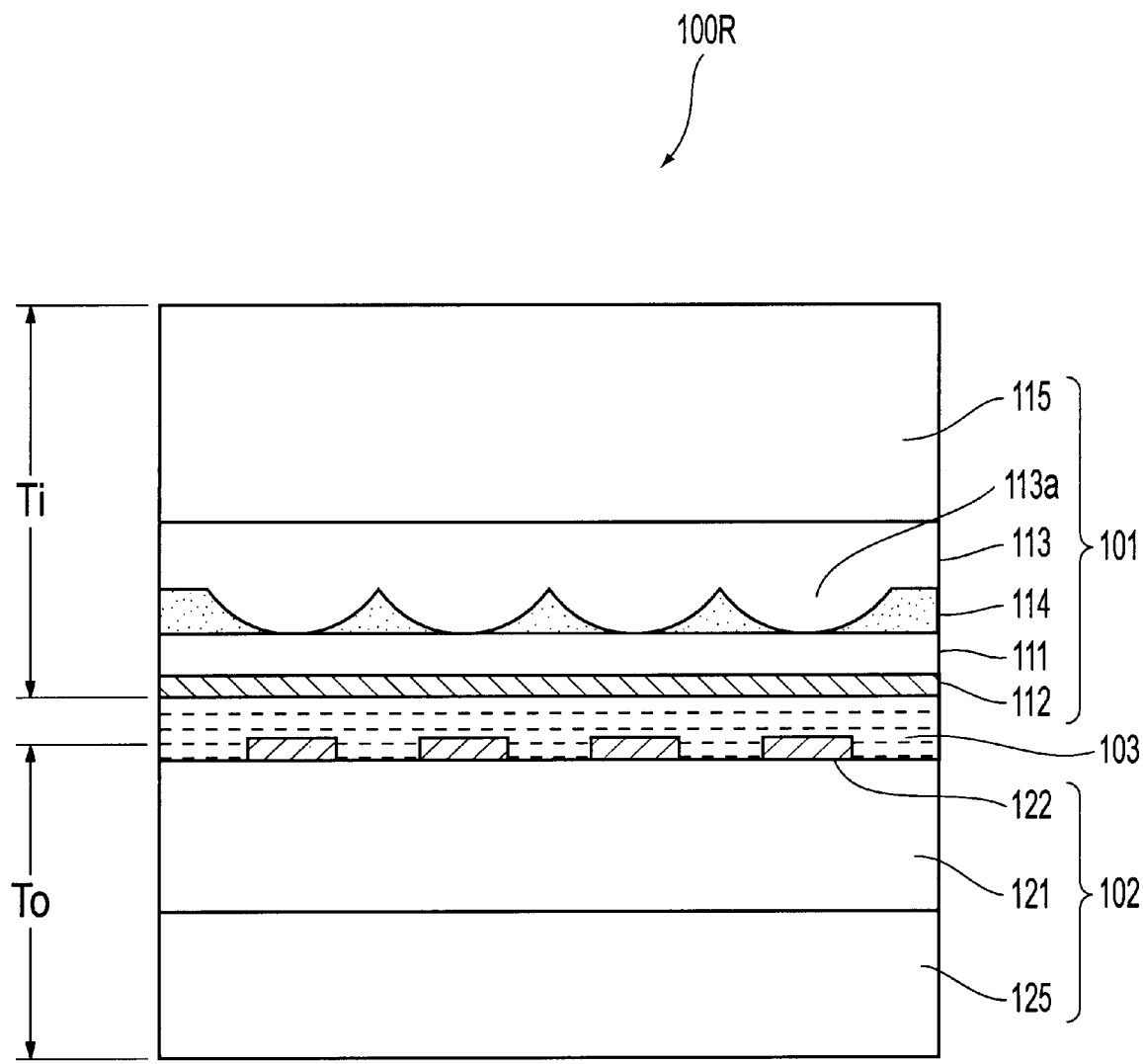
FIG. 2 is a schematic sectional view showing a configuration of a liquid crystal device 100R.

An aspect of the present invention is characterized by the configuration of the liquid crystal device to be described hereinbelow. Since the three liquid crystal devices 100R, 100G, and 100B have the same configuration, a description will now be given of the liquid crystal device 100R. FIG. 2 is a schematic sectional view showing the configuration of the liquid crystal device 100R. The liquid crystal device 100R includes a transparent emergent-side substrate 121 and a transparent incident-side substrate 111, with a liquid crystal layer 103 therebetween. A non-illustrated thin film transistor and a transparent pixel electrode 122 are provided for each pixel on the surface of the emergent-side substrate 121 adjacent to the liquid crystal layer 103. A transparent common electrode 112 is provided on the surface of the incident-side substrate 111 adjacent to the liquid crystal layer 103. Non-illustrated TFT transistors that drive each pixel electrode are provided around a plurality of the pixel electrodes 122 disposed in the form of a matrix. Each pixel includes a single pixel electrode 122, the common electrode 112, and the liquid crystal layer 103 provided therebetween. The liquid crystal device having the above-described configuration is called an active matrix liquid crystal device.

A micro-lens array 113 is bonded by an optical adhesive agent 114 on the surface of the incident-side substrate 111 opposite to the liquid crystal layer 103. The micro-lens array 113 has a plurality of micro-lenses 113a, and the micro-lenses 113a are disposed so as to condense light beams onto the pixels, respectively. An incident-side cover glass 115 is bonded by an optical adhesive agent on the surface of the micro-lens array 113 opposite to the incident-side substrate 111. An emergent-side cover glass 125 is bonded by an optical adhesive agent on the surface of the emergent-side substrate 121 opposite to the liquid crystal layer 103. Components 115, 113, and 112 provided toward the incident side relative to the liquid crystal layer 103 are equivalent to an incident-side substrate section 101, and components 122, 121, and 125 provided toward the emergent side from the liquid crystal layer 103 are equivalent to an emergent-side substrate section 102.

Polarizers serving as polarizers and analyzers are provided (not shown) outside the incident-side cover glass 115 and the emergent-side cover glass 125. The polarizers may be bonded on the incident-side cover glass 115 and the emergent-side cover glass 125, or may be disposed separately.

The liquid crystal device 100R has a light-shielding film, an alignment layer, and a thin layer transistor, etc., however, they are not shown in the drawings.

Figure 3:
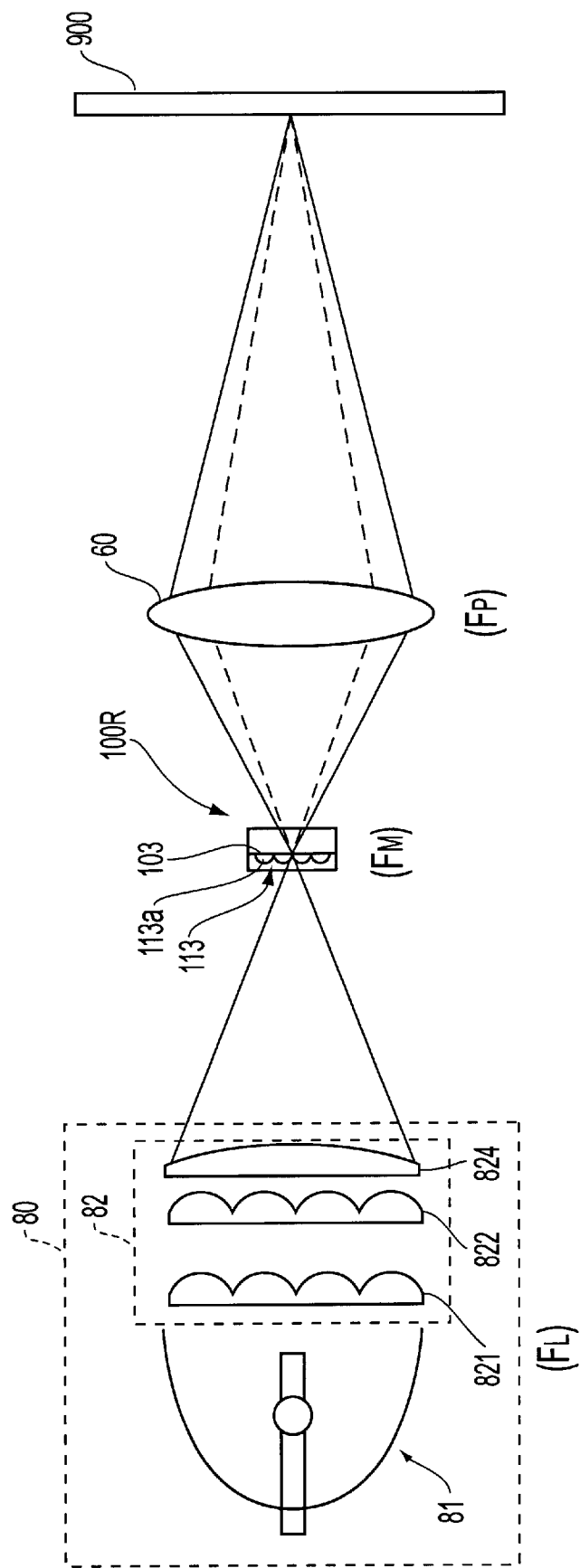
FIG. 3 is an explanatory view showing an optical system of the projection display device 10 for a red light beam R.

FIG. 3 is an explanatory view showing the optical system for the red light beam R of the projection display device 10. However, the aforementioned color-light-beam-separating optical system 924, the field lens 951, and the crossed dichroic prism 20 are omitted. The optical systems for the green light beam G and the blue light beam B are similar to that for the red light beam R, so that a description thereof will be omitted.

The micro-lenses 113a of the micro-lens array 113 are provided in such a manner that light beams entering the incident-side substrate section 101 shown in FIG. 2 sufficiently enters the respective pixels. That is, the optical properties of the micro-lenses 113a are set so that light beams entering the micro-lenses 113a corresponding to the respective pixels are condensed onto openings of the respective pixels.

In the projection display device 10, the illuminating optical system 80 is designed in such a manner that the light beams emitted therefrom are substantially condensed in the vicinity of the liquid crystal device 100R, as shown by the solid line in FIG. 3. The light beam emitted from the liquid crystal device 100R is diffused by the action of the micro-lens 113a. For this reason, the divergence of the light beam emitted from the liquid crystal device 100R is larger than the divergence (broken lines in FIG. 3) of the light beam emitted from the liquid crystal device having no micro-lens. If the F-number $F_P$ of the projection optical system 60 is equal to the F-number $F_L$ of the illuminating optical system 80, the projection optical system 60 can project only the light beam emitted from the liquid crystal device 100R that is shown by the broken line. Therefore, in order to project efficiently the light beam emitted from the liquid crystal device 100R, the F-number $F_P$ may preferably be set smaller than the F-number $F_L$ of the illuminating optical system 80.

Here, the F-number generally means a reciprocal of a diameter ratio of a lens or mirror, and the diameter ratio means the ratio of the outer diameter of the lens or mirror (or the outer diameter of an entrance pupil) to a focal length. While the projection optical system 60 usually includes a plurality of lenses, it is possible to replace the lenses with a single lens having the function equivalent to the lenses. The F-number of the projection optical system 60 would indicate the F-number of the single lens to be replaced as described above.

Incidentally, it is possible to refer to the overall optical system that applies light beams to the liquid crystal devices 100R, 100G, and 100B that are illumination areas, i.e., the optical paths to the liquid crystal devices 100R, 100G, and 100B, and optical systems existing on the optical paths, as an illuminating optical system in a broad sense. For example, the color-light-beam-separating optical system 924, the light guide optical system 927, and the field lenses 951 and 952 shown in FIG. 1 are parts of the illuminating optical system in a broad sense. Therefore, the F-number of the illuminating optical system in a broad sense essentially means an inclination of the outer edge of the light beam emitted from the illuminating optical system, as viewed from a position to which the light beam flux is condensed. However, the illuminating optical system 80 in a narrow sense mainly serves to apply light beams to the liquid crystal devices 100R, 100G, and 100B, so that the F-number of the illuminating optical system 80 in a narrow sense can be handled as the F-number of the illuminating optical system in a broad sense. In the following description, the illuminating optical system is not the illuminating optical system in a broad sense, but the illuminating optical system in a narrow sense excluding the optical systems, such as the color-light-beam-separating optical system 924, the light guide optical system 927, and the field lenses 951 and 952.

As the F-number $F_L$ of the illuminating optical system 80 in a narrow sense, the F-number of an optical element disposed at the lowermost part among a plurality of optical elements included in the illuminating optical system 80 can be used. FIGS. 4(a), 4(b), 5(a) and 5(b) are explanatory views showing the F-number of the illuminating optical system 80 in a narrow sense. As in the case of FIG. 3, the color-light-beam-separating optical system 924, the field lens 951, and the crossed dichroic prism 20 are omitted from FIGS. 4(a)–5(b) in order to simplify a description.

Figure 4A:
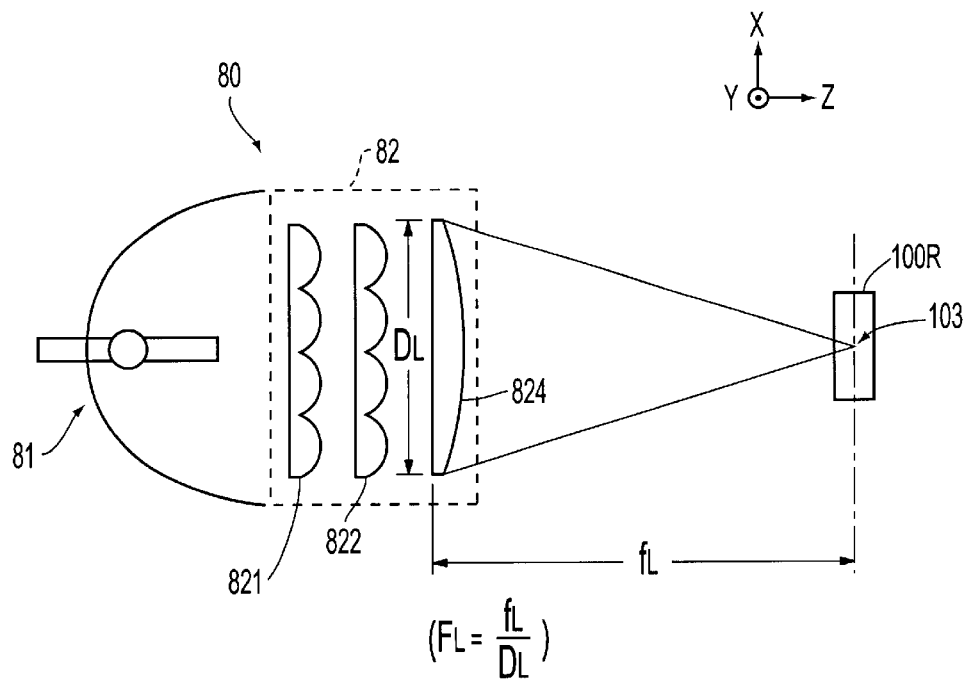
FIGS. 4(*a*) and 4(*b*) are explanatory views, each showing the F-number of an embodiment of an illuminating optical system 80.

FIG. 4(a) is an explanatory view showing the F-number of the illuminating optical system 80. Of the plurality of optical elements included in the illuminating optical system 80, the optical element disposed lowermost is the superimposing lens 824. Therefore, the F-number of the superimposing lens 824 can be handled as the F-number of the illuminating optical system 80.

If the focal length of the superimposing lens 824 is taken as $f_L$, the outer diameter of the lens is taken as $D_L$, the F-number $F_L$ of the illuminating optical system 80 is represented by $[f_L/D_L]$.

Figure 4B:
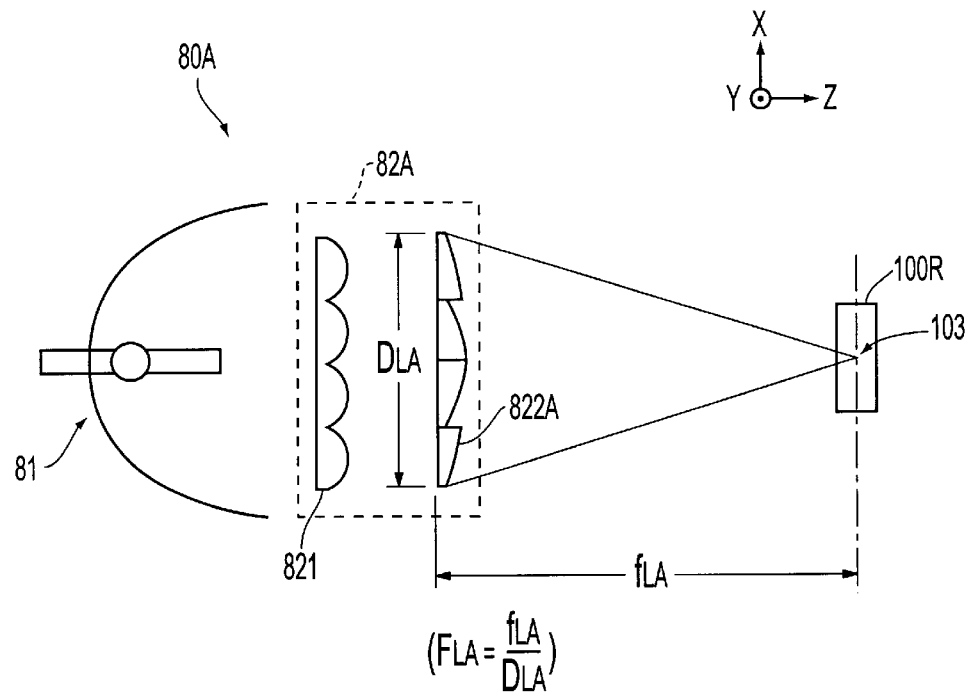

FIG. 4(b) shows another illuminating optical system 80A. The illuminating optical system 80A includes a second lens array 822A instead of the second lens array 822 and the superimposing lens 824 of the illuminating optical system 80 shown in FIG. 4(a). The second lens array 822A is a decentering lens array having the function of the second lens array 822 and the function of the superimposing lens 824 of the illuminating optical system 80.

Of a plurality of optical elements included in the illuminating optical system 80A, the optical element disposed lowermost is the second lens array 822A. Therefore, the F-number of the second lens array 822A can be handled as the F-number of the illuminating optical system 80A.

Here, the F-number of the lens array is defined by a value obtained by dividing the distance between the lens array and the illumination area by the maximum value of the outer diameter of the lens array. That is, if the distance between the second lens array 822A and the liquid crystal device 100R is taken as $f_{LA}$, the maximum value of the outer diameter of the second lens array 822A is taken as $D_{LA}$, the F-number $F_{LA}$ of the illuminating optical system 80A is represented by $[f_{LA}/D_{LA}]$. When the lens array is circular, the diameter is the maximum value of the outer diameter of the lens array, and the length of the diagonal line is the maximum value of the outer diameter of the lens array when the lens array is quadrangular.

In addition, in the projection display device 10 shown in FIG. 1, the liquid crystal device 100B is disposed at a position far from the illuminating optical system 80, as compared with the other liquid crystal devices 100R and 100G. However, on the optical path from the blue-light-beam-emitting part 946 of the color-light-beam-separating optical system 924 to the liquid crystal device 100B, the light guide optical system 927 is employed. In such a case, the distance to the liquid crystal device 100B can be regarded as the distance between the illuminating optical system 80 and the incident-side lens 954 of the light guide system, and can be regarded as being equal to the distance to the other liquid crystal devices 100R and 100G.

Incidentally, an example is shown in which the illuminating optical system 80A employs the decentering lens array as the second lens array 822A, however, the lens array similar to the first lens array 821 can also be employed. In this case, the F-number is also defined by a value obtained by dividing the distance between the lens array and the illumination area by the maximum value of the outer diameter of the lens array.

Figure 5A:
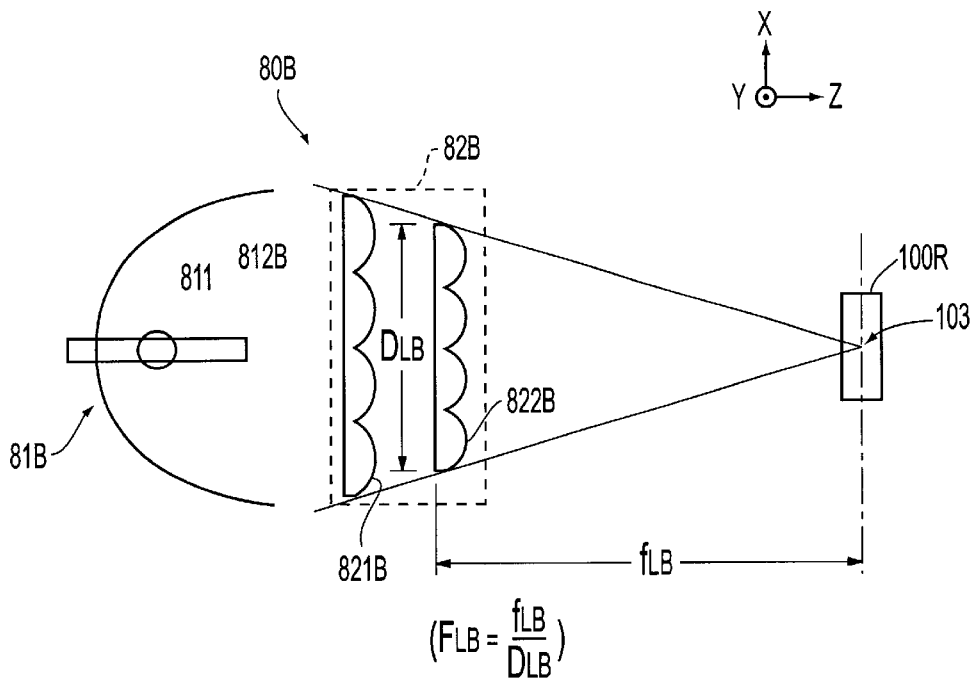
FIGS. 5(*a*) and 5(*b*) are explanatory views, each showing the F-number of an embodiment of an illuminating optical system 80.

FIG. 5(a) shows another illuminating optical system 80B. The illuminating optical system 80B includes a light source 81B and an integrator optical system 82B instead of a light source 81 and an integrator optical system 82 of the illuminating optical system 80 shown in FIG. 4(a). The light source 81B includes a light source lamp 811 and an elliptical concave mirror 812B, and light beams emitted radially from the light source lamp 811 are emitted as a condensed light beam by the concave mirror 812B. In addition, the integrator optical system 82B includes first and second lens arrays 821B and 822B provided in accordance with the width of the light beam flux of the light beam emitted from the light source 81B. The first and second lens array 821B and 822B have functions similar to those of the first and second lens arrays 821 and 822.

Of a plurality of optical elements included in the illuminating optical system 80B, an optical element disposed lowermost is the second lens array 822B. Therefore, the F-number of the second lens array 822B can be handled as the F-number of the illuminating optical system 80B.

If the distance between the second lens array 822B and the liquid crystal device 100R is taken as $f_{LB}$, the maximum value of the outer diameter of the second lens array 822B is taken as $D_{LB}$, the F-number $F_{LB}$ of the illuminating optical system 80B is represented by $[f_{LB}/D_{LB}]$.

Incidentally, it is possible to omit the integrator optical system 82B in the above illuminating optical systems 80, 80A, and 80B. In this case, the F-number of the illuminating optical system is represented by a value obtained by dividing a distance between an opening face of the concave mirror 812B and the liquid crystal device 100R by the maximum value of the outer diameter of the opening face.

Figure 5B:
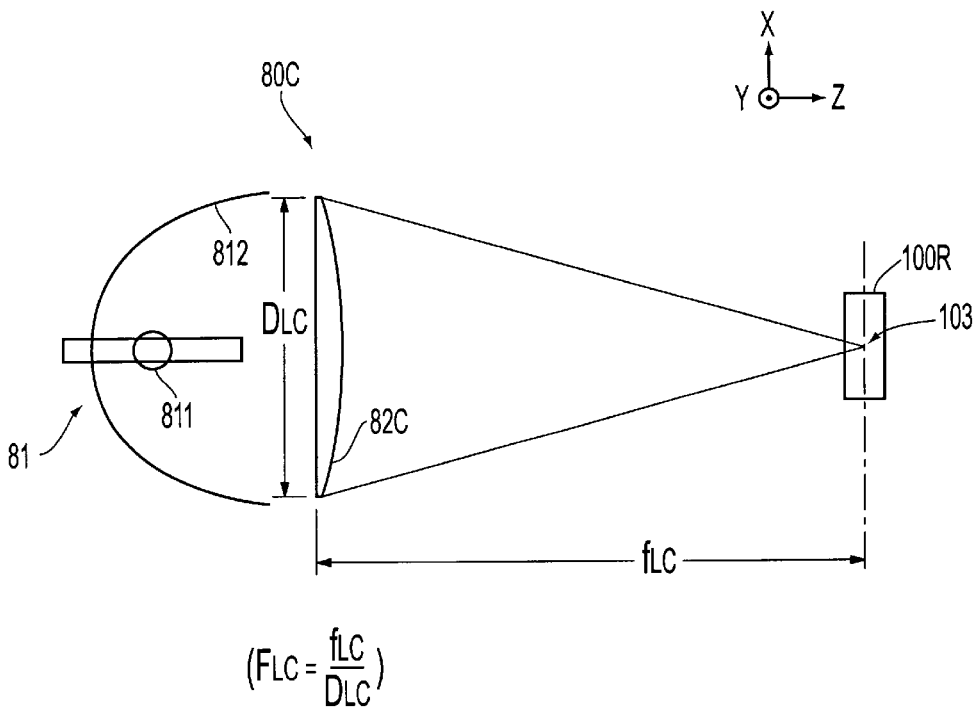

FIG. 5(b) shows another illuminating optical system 80C. The illuminating optical system 80C eliminates the integrator optical system 82 shown in FIG. 4(a), and includes a condenser lens 82C that emits substantially parallel light beams emitted from the light source 81 as a condensed light beam.

Of a plurality of optical elements included in the illuminating optical system 80C, an optical element disposed lowermost is the condenser lens 82C. Therefore, the F-number of the condenser lens 82C can be handled as the F-number of the illuminating optical system 80C.

If the focal length of the condenser lens 82C is taken as $f_{LC}$, the outer diameter of the lens of the condenser lens 82C is taken as $D_{LC}$, the F-number $F_{LC}$ of the illuminating optical system 80C is represented by $[f_{LC}/D_{LC}]$.

Figure 6:
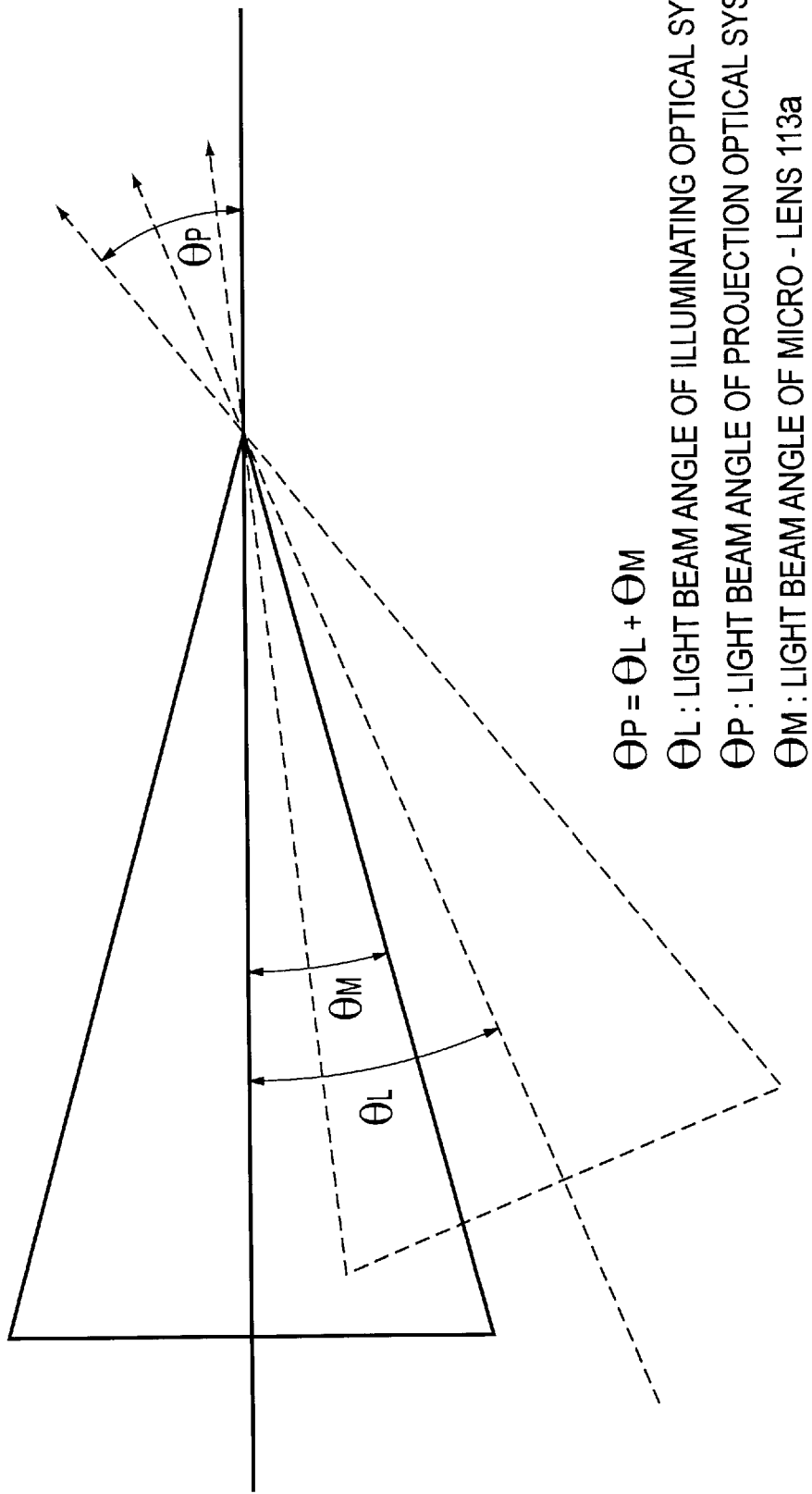
FIG. 6 is an explanatory view showing the relationship among the light beam angles $\theta_L$, $\theta_P$, and $\theta_M$ of the illuminating optical system 80, a projection optical system 60, and a micro-lens 113*a*.

FIG. 6 is an explanatory view showing the relationship among light beam angles $\theta_L$, $\theta_P$, and $\theta_M$ of the illuminating optical system 80, the projection optical system 60, and the micro-lens 113a. The light beam angle $\theta_L$ of the illuminating optical system 80, and the light beam angle $\theta_M$ of the micro-lens 113a are obtained by the following expressions (1) and (2).

$$\theta_L = 90° - \tan^{-1}(2F_L) \quad (1)$$

$$\theta_M = 90° - \tan^{-1}(2F_M) \quad (2)$$

The light beam flux guided to the projection optical system 60 includes the diffusion of the light beam flux from the illuminating optical system 80 to which the diffusion made by the micro-lens 113a is added. Therefore, the angle $\theta_P$ of the light beam flux guided to the projection optical system 60 is the sum of the light beam angle $\theta_L$ of the illuminating optical system 80 and the light beam angle $\theta_M$ of the micro-lens 113a, and is obtained by the following expression (3).

$$\theta_P = \theta_L + \theta_M = 180° - \tan^{-1}(2F_L) - \tan^{-1}(2F_M) \quad (3)$$

The F-number $F_P$ of the projection optical system 60 in this embodiment is set so as to satisfy the following expression (4) by enlarging the entrance pupil of the projection optical system 60 so that almost all of the light beam fluxes that are guided to the projection optical system 60 and diffused at the angle $\theta_P$ enter the effective area of the projection optical system 60. Incidentally, the F-number $F_P$ is not necessarily set so as to satisfy the following expression (4), however, the F-number $F_P$ may preferably be set so as to satisfy the following expression (4) in order to effectively utilize almost all of the light beam fluxes guided to the projection optical system 60.

$$F_P \leq \{\tan(90° - \theta_P)\}/2 F_P \leq [\tan\{\tan^{-1}(2F_L) + \tan^{-1}(2F_M) - 90°\}]/2 \quad (4)$$

Figure 7:
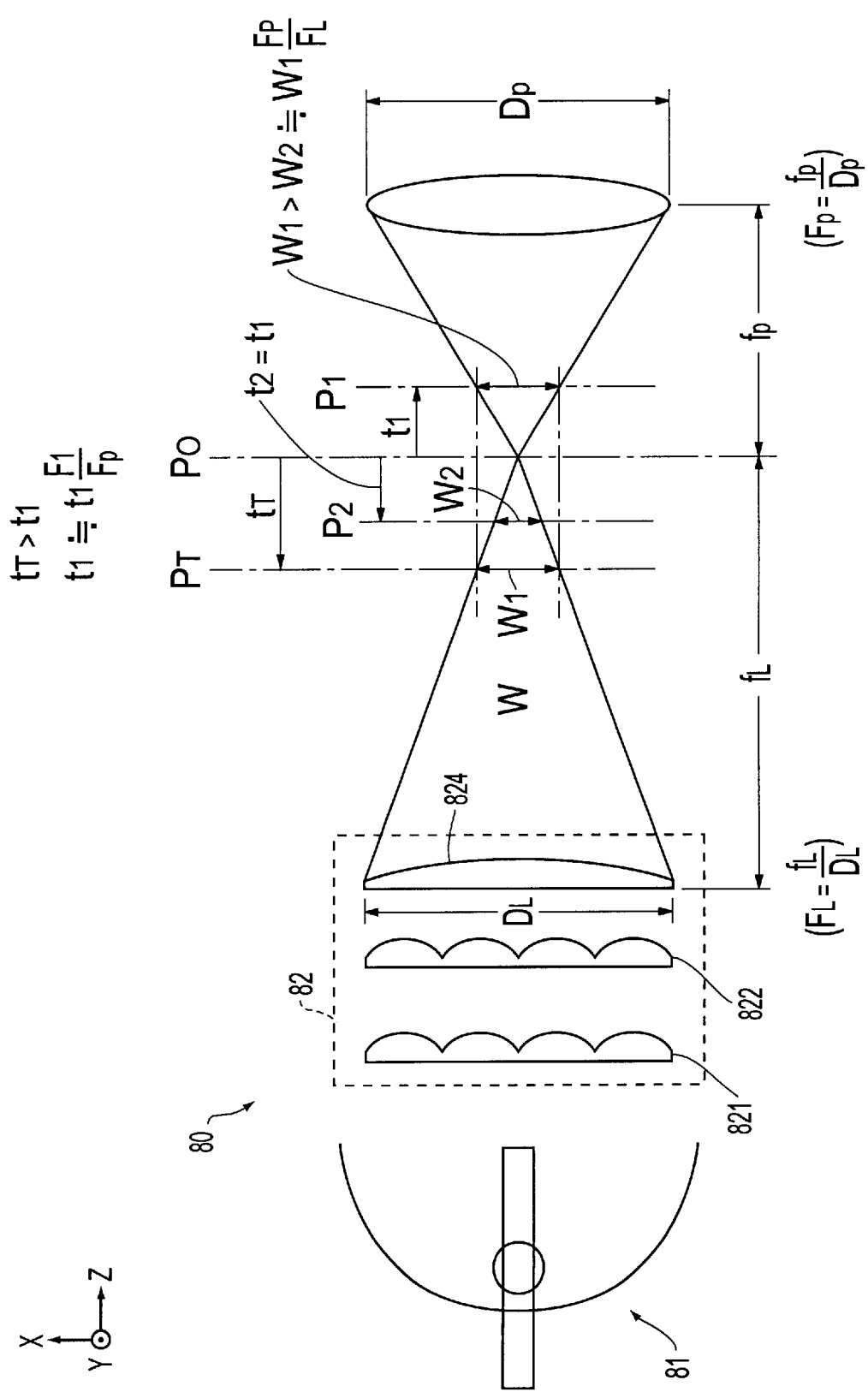
FIG. 7 is an explanatory view showing the relationship between a light beam emitted from the illuminating optical system 80 toward the liquid crystal device 100R and a light beam emitted from the liquid crystal device 100R toward the projection optical system.

FIG. 7 is an explanatory view showing the relationship between a light beam emitted from the illuminating optical system 80 toward the liquid crystal device 100R and a light beam emitted from the liquid crystal device 100R toward the projection optical system. In FIG. 7, similarly to FIG. 3, the color-light-beam separating optical system 924, the field lens 951, and the crossed dichroic prism 20 are omitted in order to simplify a description. For the superimposing lens 824, the focal length $f_L$ is set so that light beams emitted from the superimposing lens 824 are condensed in the vicinity of the liquid crystal layer 103 of the liquid crystal device 100R. In addition, for the projection optical system 60, the focal length $f_P$ is set so that the light beam diffused and emitted from a condensation position of the light beams in the vicinity of the liquid crystal layer 103 are effectively entered. Here, the width of a light beam flux at the position $P_1$ away from the condensation position $P_O$ of the liquid crystal layer 103 by the distance $t_1$ toward the projection optical system 60 is taken as $W_1$. In addition, the width of the light beam flux at the position $P_2$ away from the position $P_O$ by the distance $t_2$ equal to the distance $t_1$ toward the illuminating optical system 80 is taken as $W_2$.

Here, the width $W_2$ of the light beam flux at the position $P_2$ adjacent to the illuminating optical system 80 is substantially equal to [$W_1 \cdot F_P/F_L$]. Since $F_P/F_L$ is smaller than 1, the width $W_2$ of the light beam flux at the position $P_2$ is smaller than the width $W_1$ of the light beam flux at the position $P_1$. If dust of the same size exists at the positions $P_1$ and $P_2$, the proportion of an area of the dust occupying in the light beam flux at the position $P_2$ is larger than that at the position $P_1$.

This indicates that the difference in the width of the light beam fluxes at the positions $P_1$ and $P_2$ away from the position $P_O$ by the same distance in the opposite direction corresponds to the degree of influence of the dust existing at the position on a projected image, and the dust existing at the position where the width of the light beam flux is small greatly influences the projected image. That is, as compared with the dust existing at the position P1, the dust existing at the position $P_2$ adjacent to the illuminating optical system 80 exerts a great influence on the image to be displayed. Thus, in order to reduce the influence of the dust on incident-side of the liquid crystal layer, it is considered that the dust is adhered to the position $P_T$ that is further away from the position $P_2$ toward the incident-side.

In order to bring the influence of the dust existing at the position $P_T$ close to the influence of the dust existing at the position $P_1$ adjacent to the projection optical system 60, the distance $t_T$ between the position $P_O$ and the position $P_T$ should be longer than the distance $t_1$ between the position $P_O$ and the position $P_1$. In particular, in order to substantially equalize the influence of the dust existing at the position $P_1$ adjacent to the projection optical system 60 and the influence of the dust existing at the position $P_T$ adjacent to the illuminating optical system 80, the position $P_T$ may preferably be away from the position $P_O$ by the distance $t_T$ obtained by the following expression (5).

$$t_T = t_1 \times (F_L/F_P) \quad (5)$$

$$F_L = f_L/D_L$$

$$F_P = f_P/D_P$$

Here, $f_L$ represents the focal length of the superimposing lens 824, $D_L$ represents the diameter of the lens (or the diameter of the entrance pupil) of the superimposing lens 824, $f_P$ represents the focal length of the projection optical system 60, $D_P$ represents the diameter of the lens (or the diameter of the entrance pupil) of the projection optical system 60.

It will be understood from the foregoing that the position to which the dust adheres may preferably be kept away from the liquid crystal layer 103 in order to reduce the influence of the dust adhering to the liquid crystal devices 100R, 100G, and 100B on the projected image. The thickness Ti of the incident-side substrate section 101 and the thickness To of the emergent-side substrate section 102 of the liquid crystal devices 100R, 100G, and 100B in this embodiment are set to be sufficiently thick, so that the influence of the dust adhering to the liquid crystal devices 100R, 100G, and 100B on the projected image can be reduced.

In particular, when the liquid crystal device includes micro-lenses like the liquid crystal devices 100R, 100G, and 100B of this embodiment, the influence of the dust adhering to the side of the incident plane of the liquid crystal devices 100R, 100G, and 100B is greater than the influence of the dust adhering to the side of the emergent plane. Therefore, the position to which the dust adheres on the side of the incident plane of the liquid crystal devices 100R, 100G, and 100B may preferably be further kept away from the liquid crystal layer 103, as compared with the position to which the dust adheres on the side of the emergent plane.

In the liquid crystal devices 100R, 100G, and 100B of this embodiment, the thickness Ti of the incident-side substrate section is set to be larger than the thickness To of the emergent-side substrate. This allows the influence of the dust adhering to the incident side of the liquid crystal devices 100R, 100G and 100B on the projected image to be reduced so as to come close to the influence of the dust adhering to the emergent side on the projected image. Furthermore, it may be more preferable that the parameter $t_T$ in the above expression (5) is adjusted as the thickness Ti of the incident-side substrate section 101, and the parameter $t_1$ is adjusted as the thickness To of the emergent-side substrate 102 so as to satisfy the expression (5). This allows the influence of the dust adhering to the incident side of the liquid crystal devices 100R, 100G, and 100B to be reduced substantially similarly to the influence of the dust adhering to the emergent side.

Incidentally, the thickness of the incident-side substrate section 101 is adjustable by adjusting the thickness of the incident-side cover glass 115, the thickness of the micro-lens array 113, and the incident-side substrate 111 included in the incident-side substrate section 101. In addition, the thickness of the emergent-side substrate section 102 is adjustable by adjusting the thickness of the emergent-side substrate 121 and the emergent-side cover glass. When adjusting the thickness of the micro-lens array 113, the thickness of the incident-side substrate 111, and the thickness of the emergent-side substrate 121, it is also possible to omit the incident-side cover glass 115 and the emergent-side cover glass 125. Furthermore, it is more preferable to vary the thickness of the emergent-side cover glass 125 and the incident-side cover glass 115. This enables easy adjustment only by varying the thickness of the emergent-side cover glass 125 and the incident-side cover glass 115.

Incidentally, the incident-side cover glass 115 and the emergent-side cover glass 125 are equivalent to the incident-side glass plate and the emergent-side glass plate of the present invention.

The above-described arrangement allows the influence of the dust to be reduced even if the dust included in air adheres to the surface of the liquid crystal device, so that the deterioration of the display grade can be prevented. In particular, as described in the embodiment, the influence of the dust adhering to the side of the incident plane of the liquid crystal device can be reduced similarly to the influence of the dust adhering to the side of the emergent plane, even if the F-number of the projection optical system is smaller than the F-number of the illuminating optical system.

The present invention is not limited to the above-described embodiment and a mode for carrying out the invention, and can be carried out in various forms without departing from the spirit and scope of the invention. For example, the following modifications may be made.

While the projection display device for displaying a color image employing the liquid crystal device (liquid crystal device) of the present invention has been described in the above embodiment, the present invention can be applied to a projection display device for displaying a monochrome image. In this case, an advantageous effect similar to that of the above projection display device can be obtained.

While the active matrix liquid crystal device has been described as the liquid crystal device in the above embodiment, the present invention can be applied to a simple matrix liquid crystal device. In this case, advantageous effects similar to those of the above projection display device and liquid crystal device can also be obtained.

The liquid crystal device of the present invention can be applied not only to a projection display device but also to a direct viewing display device. In this case, the advantageous effect similar to that of the above projection display device can also be obtained.

What is claimed is:

1. A projector for projecting and displaying an image in accordance with a given image signal, comprising:

a liquid crystal device, having a plurality of pixels, and that modulates and emits a light beam according to the given image signal;

an illuminating optical system that provides a light beam to said liquid crystal device; and a projection optical system that projects a light beam emitted from said liquid crystal device;

wherein said liquid crystal device includes an emergent-side substrate section, an incident-side substrate section disposed opposing said emergent-side substrate section, and a liquid crystal layer disposed between said emergent-side substrate section and said incident-side substrate section;

wherein said incident-side substrate section includes an incident-side substrate, an electrode, that drives said liquid crystal layer, formed on the incident-side substrate, an incident side-glass plate, and a micro-lens array disposed between said incident side-glass plate and said incident-side substrate and having a plurality of micro-lenses that condense light beams onto said plurality of pixels;

wherein a thickness Ti of said incident-side substrate section along a direction of travel of a light beam is larger than a thickness To of said emergent-side substrate section along the direction of travel of the light beam, and wherein F-numbers of said illuminating optical system and said projection optical system being taken as $F_L$ and $F_P$, respectively, said thickness Ti and said thickness To satisfying the relationship $Ti \approx To \times (F_L/F_P)$.

2. The projector according to claim 1, said emergent-side substrate section including an emergent-side substrate, an electrode that drives said liquid crystal layer formed on the emergent-side substrate, and an emergent-side glass plate provided at an emergent side of said emergent-side substrate; and a thickness of said incident-side glass plate and said emergent-side glass plate being set in such a manner that the thickness Ti of said incident-side substrate section is larger than the thickness To of said emergent-side substrate section.

3. The projection according to claim 1, the illuminating optical system including multiple optical elements, an F-number of an optical element of the multiple optical elements disposed on a lowermost side of an optical path being used as said F-number $F_L$.

4. The projector according to claim 3, said illuminating optical system including:

a light source;

a dividing optical system that divides a light beam emitted from said light source into a plurality of partial light beam fluxes; and a superimposing optical system operating to substantially superimpose said plurality of partial light beam fluxes on said liquid crystal device, an F-number of said superimposing optical system being used as said F-number $F_L$.

5. The projector according to claim 3, said illuminating optical system including:

a light source;

a first lens array having a plurality of first small lenses that divide a light beam emitted from said light source into a plurality of partial light beam fluxes; and a second lens array having a plurality of second small lenses corresponding to said plurality of first small lenses, an F-number of said second lens array being used as said F-number $F_L$.

6. The projector according to claim 3, said illuminating optical system including:

a light source;

a first lens array having a plurality of first small lenses that divide a light beam emitted from said light source into a plurality of partial light beam fluxes;

a second lens array having a plurality of second small lenses corresponding to said plurality of first small lenses; and a superimposing lens that substantially superimposes a plurality of partial light beam fluxes emitted from said second lens array on said liquid crystal device, an F-number of said superimposing lens being used as said F-number $F_L$.

7. The projector according to claim 1, comprising:

a color-light-beam-separating optical system that separates a light beam emitted from said illuminating optical system into a plurality of color light beams;

a plurality of said liquid crystal devices that modulate and emit color light beams separated by said color-light-beam-separating optical system;

a color-light-beam-synthesizing optical system that synthesizes said color light beams emitted from said plurality of liquid crystal devices; and said projection optical system emitting and projecting a light beam synthesized by said color-light-beam-synthesizing optical system.

8. A projection display device for projecting and displaying an image in accordance with a given image signal, comprising:

a liquid crystal device, having a plurality of pixels, and that modulates and emits a light beam according to the given image signal;

an illuminating optical system that provides a light beam to said liquid crystal device; and a projection optical system that projects a light beam emitted from said liquid crystal device;

wherein said liquid crystal device includes an emergent-side substrate section, an incident-side substrate section disposed opposing said emergent-side substrate section, and a liquid crystal layer disposed between said emergent-side substrate section and said incident-side substrate section;

wherein said incident-side substrate section includes an incident-side substrate, an electrode that drives said liquid crystal layer formed on the incident-side substrate, and a micro-lens array disposed at an incident side of said incident-side substrate, and having a plurality of micro-lenses that condense light beams onto said plurality of pixels;

wherein a thickness Ti of said incident-side substrate section along a direction of travel of a light beam is larger than a thickness To of said emergent-side substrate section along the direction of travel of the light beam; and the projection display device according to claim 1, F-numbers of said illuminating optical system and said projection optical system being taken as $F_L$ and $F_P$, respectively, said thickness Ti and said thickness To satisfying the relationship $Ti=To\times(F_L/F_P)$.

9. The projection display device according to claim 8, the illuminating optical system including multiple optical elements, an F-number of an optical element of the multiple optical elements disposed on a lowermost side of an optical path being used as said F-number $F_L$.

10. The projection display device according to claim 9, said illuminating optical system including:

a light source;

a dividing optical system that divides a light beam emitted from said light source into a plurality of partial light beam fluxes; and a superimposing optical system operating to substantially superimpose said plurality of partial light beam fluxes on said liquid crystal device, an F-number of said superimposing optical system being used as said F-number $F_L$.

11. The projection display device according to claim 9, said illuminating optical system including:

a light source;

a first lens array having a plurality of first small lenses that divide a light beam emitted from said light source into a plurality of partial light beam fluxes; and a second lens array having a plurality of second small lenses corresponding to said plurality of first small lenses, an F-number of said second lens array being used as said F-number $F_L$.

12. The projection display device according to claim 9, said illuminating optical system including:

a light source;

a first lens array having a plurality of first small lenses that divide a light beam emitted from said light source into a plurality of partial light beam fluxes; a second lens array having a plurality of second small lenses corresponding to said plurality of first small lenses; and a superimposing lens that substantially superimposes a plurality of partial light beam fluxes emitted from said second lens array on said liquid crystal device, an F-number of said superimposing lens being used as said F-number $F_L$.

13. The projection display device according to claims 8, comprising:

a color-light-beam-separating optical system that separates a light beam emitted from said illuminating optical system into a plurality of color light beams;

a plurality of said liquid crystal devices that modulate and emit color light beams separated by said color-light-beam-separating optical system;

a color-light-beam-synthesizing optical system that synthesizes said color light beams emitted from said plurality of liquid crystal devices; and said projection optical system emitting and projecting a light beam synthesized by said color-light-beam synthesizing optical system.

* * * * *